(12) United States Patent
Maleki et al.

(10) Patent No.: US 11,072,329 B2
(45) Date of Patent: Jul. 27, 2021

(54) GROUND VEHICLE CONTROL TECHNIQUES

(71) Applicant: Traxen Inc., Plymouth, MI (US)

(72) Inventors: Ali Maleki, Plymouth, MI (US); Michael Makowski, Plymouth, MI (US); Naren Reddy Dhansri, Plymouth, MI (US); Nabil H K Hirzallah, Plymouth, MI (US); Gerti Tuzi, Plymouth, MI (US)

(73) Assignee: Traxen Inc., Plymouth, MI (US)

( * ) Notice: Subject to any disclaimer, the term of this patent is extended or adjusted under 35 U.S.C. 154(b) by 146 days.

(21) Appl. No.: 16/355,641

(22) Filed: Mar. 15, 2019

(65) Prior Publication Data

US 2019/0375407 A1    Dec. 12, 2019

Related U.S. Application Data

(63) Continuation-in-part of application No. 16/289,635, filed on Feb. 28, 2019, now abandoned, and a continuation-in-part of application No. 16/212,108, filed on Dec. 6, 2018.

(60) Provisional application No. 62/683,188, filed on Jun. 11, 2018.

(51) Int. Cl.
  *B60W 30/18*  (2012.01)
  *B60W 10/10*  (2012.01)
  *B60W 50/00*  (2006.01)
  *B60W 10/18*  (2012.01)

(52) U.S. Cl.
  CPC ............ *B60W 30/18* (2013.01); *B60W 10/10* (2013.01); *B60W 10/18* (2013.01); *B60W 50/0097* (2013.01); *B60W 2050/0028* (2013.01); *B60W 2510/0638* (2013.01); *B60W 2510/0657* (2013.01); *B60W 2510/104* (2013.01); *B60W 2510/105* (2013.01); *B60W 2510/1015* (2013.01); *B60W 2510/1025* (2013.01); *B60W 2520/10* (2013.01); *B60W 2520/105* (2013.01); *B60W 2552/00* (2020.02); *B60W 2554/00* (2020.02); *B60W 2710/0666* (2013.01); *B60W 2710/10* (2013.01); *B60W 2710/18* (2013.01)

(58) Field of Classification Search
  CPC ...... B60W 10/06; B60W 10/10; B60W 10/18; B60W 30/18; B60W 30/14; B60W 30/143; B60W 30/16; B60W 30/165; B60W 50/0097
  See application file for complete search history.

(56) References Cited

U.S. PATENT DOCUMENTS

| 9,020,726 | B2 | 4/2015 | Boeckenhoff et al. |
| 2016/0176402 | A1* | 6/2016 | Andersson ............ B60W 30/16 701/96 |
| 2016/0257288 | A1* | 9/2016 | Miller ............. B60W 30/18127 |

(Continued)

FOREIGN PATENT DOCUMENTS

DE    102016214045    2/2018

*Primary Examiner* — Edwin A Young

(57) ABSTRACT

Ground vehicle control techniques adapted to reduce energy consumption, braking, shifting, travel distance, travel time, and or the like. The techniques can generate a target speed window and a target vehicle performance plan for controlling operation of a ground vehicle along a current and one or more upcoming segments of a roadway responsive to the dynamic driving environment.

23 Claims, 2 Drawing Sheets

(56) References Cited

U.S. PATENT DOCUMENTS

2017/0259822 A1* 9/2017 Schubert ............. B60W 30/143
2018/0072157 A1   3/2018 Koebler et al.

* cited by examiner

GROUND VEHICLE CONTROL TECHNIQUES

CROSS-REFERENCE TO RELATED APPLICATIONS

This is a Continuation-in-Part of U.S. patent application Ser. No. 16/289,635 filed Feb. 28, 2019, a Continuation-in-Part of U.S. patent application Ser. No. 16/212,108 filed Dec. 6, 2018, and claims the benefit of U.S. Provisional Patent Application No. 62/683,188 filed Jun. 11, 2018, all of which are incorporated herein in their entirety.

BACKGROUND OF THE INVENTION

The operating costs of commercial vehicles include fuel, labor, equipment, insurance and the like. The fuel costs are the largest portion of the operating costs. The profit margin across the commercial truck industry is currently approximately 4.8%. Therefore, if operating costs, through fuel savings, can be reduced by just 5%, the net operating profit margins for a trucking company can be increased by 50%.

Generally, optimal energy efficiency can be obtained while cruising at a steady speed, at minimal throttle and with the transmission in the highest gear on a level roadway. However, the driving environment is highly dynamic and therefore ground vehicles cannot be operated at a steady state cruising speed, with minimal throttle input in the highest gear. Hills, curves, traffic, weather and the like will require the vehicle to operate at varying speeds, accelerating and braking, and changing between multiple gears. The driving environment and the skill of the given driver can have a significant impact on energy efficiency. Different drivers will operate ground vehicles at different speeds, have different acceleration and braking patterns, and use different gears at different times. For example, two different drivers may operate substantially identical vehicles and maneuver along identical routes during identical traffic conditions. The first driver may operate the ground vehicle differently from the second driver. The first driver may, for example, apply the brakes significantly less than the second driver by coasting toward upcoming stops, in comparison to the second driver who may continue to drive toward the stop and abruptly apply the brakes upon reaching the stop. The different driving styles of the drivers can result in different overall energy utilization for the same trips.

Conventional, cruise control and adaptive cruise control systems can provide some increases in fuel economy. The cruise control and adaptive cruise control systems allow the driver to set the speed of the ground vehicle. Adaptive cruise control systems can also automatically adjust the vehicle speed by gradually braking and accelerating such that the ground vehicle maintains a specified distance from an impeding ground vehicle while operating at the set speed as much as possible. The set speed and controlled acceleration and braking of cruise control and adaptive cruise control systems typically provides some improved fuel efficiency in comparison to manual operation by the second type of driver. However, the driving style of the first driver may provide better energy efficiency than the cruise control and adaptive cruise control systems. Therefore, there is a continuing need for further energy economy techniques.

SUMMARY OF THE INVENTION

The present technology may best be understood by referring to the following description and accompanying drawings that are used to illustrate embodiments of the present technology directed toward ground vehicle control techniques.

In one embodiment, a ground vehicle control system can include a plurality of sensors, one or more controllers, one or more other data sources, and the like. The plurality of sensors can be configured to detect ground vehicle operating parameters, driver control inputs, and driving environment parameters. The controller can be configured to determine a target speed window based on one or more of the ground vehicle operating parameters and driving environment parameters. The controller can also be configured to determine a target vehicle performance plan based on the target speed window and one or more of the ground vehicle operating parameters, driver control inputs and driving environment parameters. The target speed window and target vehicle performance plan can be utilized for controlling operation of the ground vehicle in a passive mode, active non-autonomous mode, active autonomous mode, and or the like.

In another embodiment, a ground vehicle control method can include determining a target speed window based on one or more of one or more ground vehicle operating parameters and one or more driving environment parameters. A target vehicle performance plan can be determined based on the target speed window and one or more of the one or more ground vehicle operating parameters, one or more driver control inputs and the one or more driving environment parameters to reduce energy consumption by a ground vehicle. The target speed window and target vehicle performance plan can be utilized to reduce energy consumption, braking, shifting and the like during operation of the ground vehicle.

The systems and methods, in accordance with aspects of the present technology, can dynamically adjust the operation of the ground vehicle such that energy consumption is decreased. The systems and methods can advantageously adjust the operation of the ground vehicle to decrease the overall energy consumption of the ground vehicle as the roadway, driving environment, and conditions associated with the roadway dynamically change. For example, rather than simply having the ground vehicle operate at a set speed, the systems and methods may automatically adjust the operation of the ground vehicle to operate within a target vehicle performance plan bounded by a minimum and maximum speed of a target speed window. The systems and methods can identify various ground vehicle operating parameters, driver control inputs, driving environment parameters and the like, determine the corresponding impact on the operation of the ground vehicle in real-time, and automatically adjust the operation of the ground vehicle accordingly.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
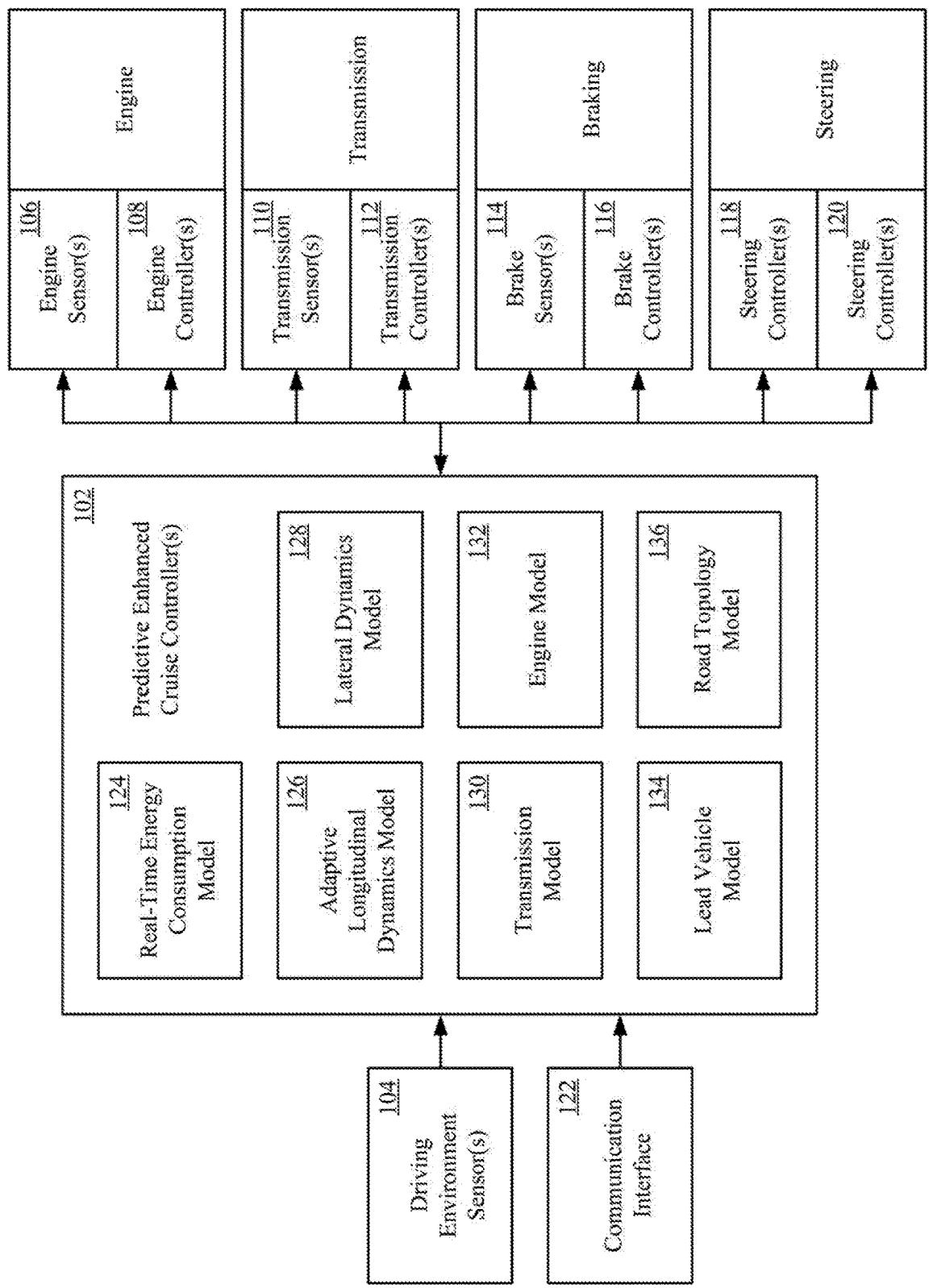
FIG. 1 shows a predictive enhanced cruise controller for use in a ground vehicle, in accordance with aspects of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

As used herein, a ground vehicle includes a motorized vehicle with wheels that maneuvers along roadways. For example, ground vehicles can include, but are not limited to, semi-trucks, tractor-trailers, trucks, busses, motorhomes, automobiles, cars, motor cycles, recreational vehicles (RVs), all-terrain vehicles (ATVs), utility vehicles (UTVs), tractors and the like. As used herein, the term energy can include, but is not limited to, gasoline, diesel, propane, natural gas, ethanol, alcohol, electricity, solar, battery, hydrogen, and the like. As used herein, engines can include, but are not limited to, internal combustion engines, electric motors, and the like. As used herein, the term powertrain includes the mechanisms by which power is generated and transmitted to the roadway by the ground vehicle. As used herein, the term performance can include, but is not limited to, energy consumption, braking, shifting, travel time, travel distance, and or the like.

Referring now to FIG. 1, a predictive enhanced cruise controller for use in a ground vehicle, in accordance with aspects of the present technology, is shown. The predictive enhanced cruise controller 102 can be communicatively coupled to one or more driving environment sensors 104, one or more engine sensors 106 and or one or more engine controllers 108. The predictive enhanced controller 102 can also be communicatively coupled to one or more transmission sensors 110, one or more transmission controllers 112, one or more brake sensors 114, one or more brake controllers 116, one or more steering sensors 118, one or more steering controllers 120, and or other similar sensors and controllers. The predictive enhanced cruise controller 102 can also be communicatively coupled to one or more external networks through one or more communication interfaces 122.

In one implementation, the one or more predictive enhanced cruise controllers 102 and one or more of the sensors and controllers can be integral to the ground vehicle. The one or more predictive enhanced cruise controllers 102 can be implemented in hardware, firmware, software or any combination thereof. In other implementation, the one or more predictive enhanced controllers 102 can be implemented in a distributed computing architecture. For example, some functions of the predictive enhanced cruise controller can be implemented as computing device-executable instructions (e.g., computer program) that are stored in computing device-readable media (e.g., computer memory) and executed by a computing device (e.g., processor) on the ground vehicle. One or more other functions can be implemented on one or more other computing devices external to the ground vehicle. The one or more other functions can for example be implement in the cloud, on a remove server, or the like.

The engine sensors 106 and engine controllers 108 can include, but not limited to, Engine Control Modules (ECM), Engine Control Units (ECU), throttle position sensors, fuel injector sensors, intake sensors, mass airflow sensors, oxygen sensors, exhaust sensors, engine tachometers, voltmeters, current meters, temperature sensors, fluid level sensors, and the like. The engine sensors 106 can for example provide ground vehicle operating parameters such as current fuel consumption, engine revolutions per minute (RPMs), and the like. The engine controllers 108 can for example control fuel injection parameters in response to throttle control inputs, and the like. The transmission sensors 110 and transmission controllers 112 can include, but not limited to, shift lever position sensors, gear selection sensors, clutch pedal position sensors, Transmission Control Units (TCU), tachometers, temperature sensors, fluid level sensors, hydraulic controllers, servos, and the like. The transmission sensors 110 can for example provide vehicle operating parameters such as transmission RPM, torque, current gear, and the like. The transmission controllers 112 can for example control clutch and shift control inputs and the like. The brake sensors 114 and brake controllers 116 can include, but not limited to, brake pedal position sensors, brake pedal force sensors, hydraulic pressure sensors, air pressure sensors, torque sensors, anti-lock brake system (ABS) controllers, and the like. The steering sensors 118 and steering controllers 120 can include, but not limited to, steering position sensors and the like. The driving environment sensors 104 can include, but not limited to, cameras, radar, inertial measurement units (IMU), global position systems (GPS), light detection and ranging (LIDAR), temperature sensors, dedicated short range communications (DSRC), and the like. The driving environment sensors 104 can for example provide driving environment parameters such as road surface condition, road width, lane markings, traffic control devices, traffic conditions, line of sight, visibility, lighting, current weather, location, and the like. The communication interface 122 can provide for downloading or streaming of two- or three-dimensional map data, current and future weather conditions, traffic conditions, and or the like. Some sensors and controllers can provide and or operate on the same, similar and or overlapping data, functions and the like. In addition, various data and or functions can be combined to increase confidence, increase accuracy, generate additional data, generate higher level functions, and or the like.

Figure 2:
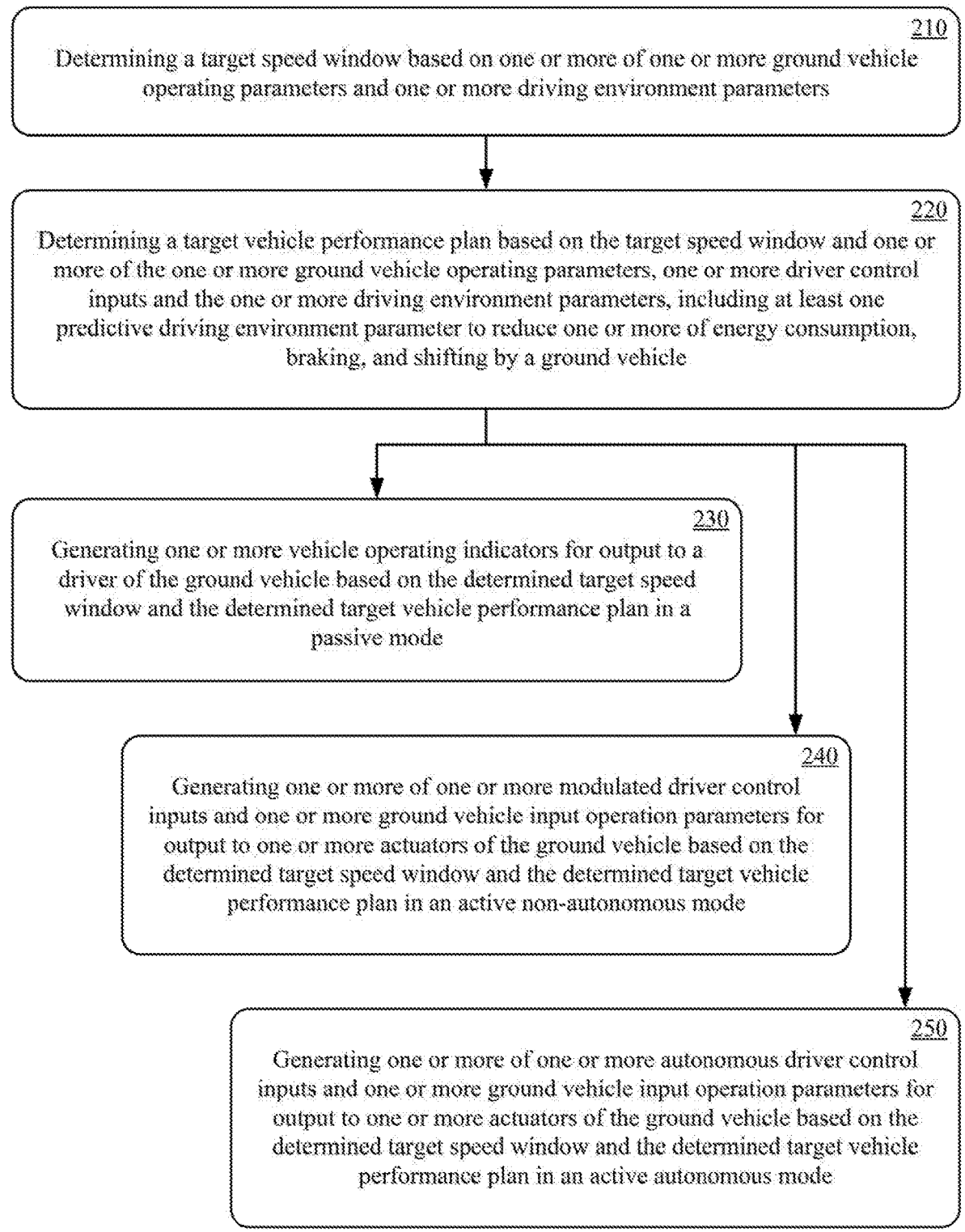
FIG. 2 shows a predictive enhanced cruise control method for use in a ground vehicle, in accordance with aspects of the present technology.

The predictive enhanced cruise controller 102 will be further explained with reference to FIG. 2. The predictive enhanced cruise controller 102 can be configured to determine a target speed window based on one or more of one or more ground vehicle operating parameters and one or more driving environment parameters, at 210. For example, posted speed limits (driving environment parameters) may specify maximum operating speeds on various segment of one or more roadways. The posted speed limits may also specify minimum operating speeds in some cases. The speed limits can, for example, be received from electronic map data sources, images of the roadway captured by cameras on the ground vehicle, or any other data that characterizes the roadway. Similarly, a minimum safe following distance determined from one or more forward looking cameras, LIDAR, radar or the like can be utilized to calculate an average speed for current traffic conditions. Similarly, weather conditions can be utilized by the predictive enhanced cruise controller 102 to calculate a safe speed for road conditions. A maximum speed can also be determined based on road curvature and safe lateral acceleration. An operator, such as the company operating the vehicle, may specify a maximum operating speed. The one or more different specified and or determined speeds can be combined to generate a target speed window.

For example, a posted speed limit, detected by a camera or determined from map data, may specify a maximum speed of 65 miles per hour (MPH) and a minimum speed of 45 MPH. In addition, an ambient outside temperature measured by a temperature sensor on the vehicle and current operation of the windshield wipers may indicate a freezing temperature and precipitation. In such case, the predictive enhanced cruise controller 102 may determine that the maximum safe speed for current road conditions should be limited to 55 MPH, and therefore determine a target speed window of between 45 and 55 MPH. In another example, a posted speed limit may specify a maximum speed of 55 MPH. However, stop and go traffic may be detected by forward looking cameras on the vehicle. The predictive enhanced cruise controller 102 may determine, based upon current minimum safe distance values, that the safe speed for current traffic conditions is between 0 and 25 MPH. Therefore, in the stop and go traffic conditions, the target speed window may be determined to be between 0 and 25 MPH. In yet another example, the posted speed limit for the current and next few segments of an interstate highway may be 55 MPH. However, topographical data for the next segment of roadway may indicate a curve in the road. The topographical data can, for example, be received from electronic map data sources, images of the roadway captured by cameras on the ground vehicle, or any other data that characterizes the roadway. In such case, the predictive enhanced cruise controller 102 may determine a safe speed for the curved segment of the road to be 45 MPH. In addition, based upon a scheduled delivery time and a predicted route, the predictive enhanced cruise controller 102 may determine that the minimum average speed to be 40 MPH. In such case the predictive enhanced cruise controller 102 may determine a target speed window for the segment including the curve to be between 40 and 45 MPH.

At 220, the predictive enhanced cruise controller 102 can further determine an adaptive target vehicle performance plan based on the target speed window and one or more of the one or more ground vehicle operating parameters, one or more driver control inputs and the one or more driving environment parameters. In one implementation, the adaptive target vehicle performance plan can be determined based upon the dynamic load on the powertrain of the ground vehicle. The powertrain load can be determined from one or more ground vehicle operating parameters, driver control inputs and or driving environment parameters including, but not limited to, the ground speed, acceleration, engine torque, engine output power, transmission torque, transmission output power, gear ratio, current fuel consumption rate, roadway geometry, gross vehicle weight, cargo weight, rolling resistance of the vehicle, historical datasets, and the like. The historical datasets can include statistical data captured from different trips along the same or similar road segments, for the same or similar ground vehicles, during the same or similar traffic conditions, during the same or similar weather conditions, and or the like. The powertrain load along with one or more other ground vehicle operating parameters, driver control inputs and or driving environment parameters can be utilized to determine an adaptive target vehicle performance plan as the ground vehicle travels along a current roadway segment and or one or more upcoming roadway segments.

For example, the predictive enhanced cruise controller 102 may determine that the upcoming segment of roadway includes a short flat portion, a steep uphill grade and then continues along another flat grade, from three-dimensional map information. The predictive enhance cruise controller 102 may have also determined a target speed window of 55 to 65 MPH for the upcoming segment. The predictive enhanced cruise controller[102] may therefore generate an adaptive target vehicle performance plan that includes gradually increasing the ground speed of the vehicle from a current speed of 60 to 65 MPH as the vehicle proceeds through the initial flat portion of the segment. The gradual increase in speed along the short flat portion may incur a relatively small increase in fuel consumption, while allowing the vehicle to maintain the higher speed part way up the steep incline. The adaptive target vehicle performance plan may then provide for the vehicle to gradually slow from 65 MPH to 55 MPH as it continues to climb up the steep incline. In contrast, if the ground vehicle tried to maintain a constant speed up the incline, a significant amount of additional fuel would be consumed. Therefore, the adaptive target vehicle performance plan can provide for an overall reduction in fuel consumption by the ground vehicle while maintaining an average speed over the entire segment close to the center of the target speed window. In another example, predictive enhanced cruise controller 102 may determine that the powertrain is nearing an upper end of engine RPM versus fuel efficient curve for a given transmission gear and that a shift to a higher gear ratio should be executed soon. However, from LIDAR sensor data, the predictive enhanced cruise controller 102 may detect that traffic ahead is starting to slow. Therefore, the predictive enhanced cruise controller 102 may update the current adaptive target vehicle performance plan to hold off on the potential gear shift. The current ratio of relatively high engine RPM to torque can instead be utilized to maintain or even slightly slow the speed of the ground vehicle in response to the traffic ahead starting to slow. Avoiding the situation of shifting to a high gear and then shift back down a short period of time later, and vice versa, can reduce overall energy consumption over the course of a trip. Accordingly, by predicting the speed, acceleration, torque, power, braking and the like along an upcoming segment of the roadway, shifting can be reduced which can in turn reduce overall energy consumption. Similarly, predicted speed and gear selection along an upcoming segment of the roadway, can be utilized to reduce braking which can in turn reduce overall energy consumption.

The predictive enhanced cruise controller 102 can further determine the adaptive target vehicle performance plan based on one or more driving risk factors. The one or more driving risk factors can be determined from one or more of one or more of the plurality of ground vehicle operating parameters, driver control input, and or one or more driving environment parameters. The driving risk factors can for example be determined based on current and or future traffic conditions, roadway geometry and or topology, current and or future weather conditions, driver control inputs, driver alertness and readiness levels, location-based accident history data, and or the like. The driving risk factors along with one or more other ground vehicle operating parameters, driver control inputs and or driving environment parameters can be utilized to determine an adaptive target vehicle performance plan as the ground vehicle travels along one or more roadway segments. The driving risk factors may adjust the speed, shifting and or braking of the vehicle over the current and or future roadway segment. For example, when icy conditions are detected the adaptive target vehicle performance plan may provide for a further reduction of the speed of the vehicle around curves, and more gradual acceleration and braking. In another example, the following distance can be increased when the driver attentiveness is determined to be low from an in-cab camera.

The predictive enhanced cruise controller 102 can operate in one or more modes that can include a passive mode, an active non-autonomous mode, an active autonomous mode and or the like. In a passive mode, the predictive enhanced cruise controller 102 can generate one or more vehicle operating indicators for output to a driver of the ground vehicle based on the determined target speed window and the determined adaptive target vehicle performance plan, at 230. The target speed window and adaptive target vehicle performance plan can adjust vehicle operating indicators output to the driver to assist the driver in reducing overall energy consumption, reducing shifting, reducing braking, and or the like to increase performance. For example, audio, visual and or haptic clues can be utilized to indicate to the driver when he or she should shift a manual transmission. The predictive enhanced cruise controller 102 can also provide feedback on how the driver's manual performance compares to the predictive enhanced cruise control. The feedback can be used to train drivers, for logistics, and or the like.

In an active non-autonomous mode, the predictive enhanced cruise controller 102 can generate one or more of one or more modulated driver control inputs and one or more ground vehicle input operation parameters for output to one or more actuators of the ground vehicle based on the determined target speed window, the determined adaptive target vehicle performance plan and one or more driver control inputs, at 240. For example, the determined target speed window may be between 55 and 65 MPH, and the determined adaptive target vehicle performance plan may provide for the actual speed of the vehicle to decrease from 65 to 55 MPH as the vehicle climbs a steep grade in the upcoming segment of the roadway. As the driver operates the ground vehicle, the driver may depress the gas pedal further and further to try and maintain a constant speed of the vehicle as it proceeds up the hill. However, the increase in throttle may simply increase energy consumption without being able to maintain speed up the steep incline. In such case, the predictive enhanced cruise controller 102 can modify the throttle input determined from the gas pedal control input by the driver based on the determined target vehicle performance plan. As a result, the increasing throttle input by the driver can be modified to provide a decreasing throttle input to provide for the vehicle to slow from 65 to 55 MPH as the ground vehicle climbs the steep grade to decrease overall energy consumption.

In an active autonomous mode, the predictive enhanced cruise controller 202 can generate one or more of one or more autonomous driver control inputs and one or more ground vehicle input operation parameters for output to one or more actuators of the ground vehicle based on the determined target speed window and the determined adaptive target vehicle performance plan, at 250. For example, the predictive enhanced cruise controller 102 can control throttle inputs to the engine controller, synchronize engine and transmission speeds, and control shifting operations through the transmission controller. The predictive enhanced cruise controller 102 can also control braking and steering to autonomously control operation of the ground vehicle in accordance with the determined target speed window and adaptive target vehicle performance plan.

In addition, different driver control inputs and or ground vehicle input operation parameters can be generated as indicators, modulate inputs, or autonomous control inputs. For example, the predictive enhanced cruise controller 102 can generate one or more steering operation indicators for presentation as audio, visual and or haptic clues. However, the predictive enhanced cruise controller 102 can determine the smoothness of a road surface from a camera and generate an autonomous ground vehicle input operation parameter that controls the height of the ground vehicle. In such case, the suspension height of the ground vehicle can be automatically lowered to reduce airflow underneath the vehicle, thereby reducing the aerodynamic drag forces and increase energy efficiency when the roadway is smooth.

Referring again to FIG. 1, the one or more predictive enhanced cruise controllers 102 can include one or more models 124-136 for use in decreasing energy consumption by the ground vehicle. The models may be relatively simple to facilitate the design of optimization schemes. At the same time the models should include applicable information of the underlying process. The models should also facilitate the adoption of parameters in real-time to account for variations in real world conditions.

In one implementation, the predictive enhanced cruise controller 102 can include a real-time energy consumption model 124. The real-time model can allow for the prediction of energy/unit time that is to be spent by the propulsion system to produce a certain amount of engine speed and torque in accordance with Equation 1:

$$\dot{e} = h(T_e, \omega_e)$$

$$\dot{e} = c_0 + c_1 T_e + c_2 \omega_e + c_3 T_e \omega_e + c_4 T_e^2 + c_5 \omega_e^2 + c_6 T_e^2 \omega_e^2 +$$

$$\ldots + c_{3n-2} T_e^n + c_{3n-1} \omega_e^n + c_{3n} T_e^n \omega_e^n \quad (1)$$

In the case of an electric engine, this model may be used to predict the total amount of electrical energy required to drive the vehicle for a given set of vehicle and environment operating conditions. In case of internal combustion engine, it may be used to determine the total amount of chemical energy or directly the mass (kg) or fuel volume (liter). The model parameters may be continuously adopted online to account for variations due to real world operating conditions (for example, in an internal combustion engine, the variation could be because of ambient temperature, pressure, varying fuel quality, etc.). In another implementation, this real-time energy consumption model can be derived using neural networks based on offline training data.

The predictive enhanced cruise controller 102 can also include an adaptive vehicle longitudinal dynamic model 126. The longitudinal dynamics model of the ground vehicle can be derived using a force balance equation in accordance with Equation 2:

$$m\dot{v}_x = -\frac{1}{2}\rho C_d A(v_x - v_w)|v_x - v_w| + \quad (2)$$

$$\frac{1}{r_w}(r_d r_g(\alpha)n(\alpha)T_e - r_d T_{trd} - T_b - I_w \dot{\omega}_w) -$$

$$mg(\mu_0 + \mu_1 v_x + \mu_x v_x^2)\cos\theta + mg\sin\theta$$

A simplified parametric model can be provided in accordance with Equation 3:

$$\dot{v}_x = -k_1 v_x^2 - k_2 v_x + k_3 r_g(\alpha)\eta(\alpha)T_e - k_4(T_b + k_5 T_{trd}) -$$

$$k_6 \cos\theta + k_7 g \sin\theta \quad (3)$$

The initial values of the coefficients of this parametric model can be derived based on offline data and further these coefficients may be adjusted online to account for ground vehicle variations (example, changing mass, etc.).

The predictive enhanced cruise controller 102 can also include a vehicle lateral dynamics model 128, a transmission model 130, an engine model 132, a lead vehicle model 134, a road topology model 136 and or the like. In a road topology model 136, data from maps can be used to determine useful properties of a roadway, such as road curvature, road gradients, safe and legal speed limits, and the like. Estimation of the future maximum speed that a ground vehicle can travel on a segment of a roadway can be utilized to optimize energy consumption and ensure safe operation by timely reduction of propulsion forces and or increasing retardation forces for example. The retardation forces can include transmission retarding, downshifting, engine retarding and or the like. One method of calculating the maximum safe speed is to parameterize the roadway. After having a parameterized representation of the roadway, curvature values can be calculated by analytical differentiation. The maximum speed of driving can then be calculated using the curvature information obtained from a map. A cubic parameterized curve results in a representation of roads which is twice differentiable and is suitable for curvature estimation. In such an approach, the preview horizon can be divided into a set of four or more consecutive points. For every four or more consecutive points the parameterized model can be obtained in real time from map data and the curvature can be calculated in accordance with Equations 4, 5 and 6:

$$x(s) = c_{11} s^3 + c_{12} s^2 + c_{13} s + c_{14} \quad (4)$$

$$y(s) = c_{21} s^3 + c_{22} s^2 + c_{23} s + c_{24} \quad (5)$$

$$k(s) = \frac{1}{r(s)} = \frac{x'(s)y''(s) - y'(s)x''(s)}{((x'(s))^2 + (y'(s))^2)^{2/3}} \quad (6)$$

where s=0 represent the first point and s=1 represent the last point. The curvature determined in accordance with Equations 4, 5 and 6 can be used to determine maximum travel speed. For a ground vehicle traveling along a curved path, a certain amount of centripetal acceleration is needed. The centripetal acceleration is orthogonal to the motion of the ground vehicle and towards a fixed point of the instantaneous center of curvature of the path. The magnitude of centripetal acceleration can be determined in accordance with Equation 7:

$$a_x = \frac{v_x^2}{r} = v_x^2 k \quad (7)$$

Because of the centripetal force, there will be a centrifugal force that is directed in the opposite direction. The centrifugal force causes a weight transfer in the ground vehicle in the direction of the centrifugal force. To prevent rollover, or in some cases to ensure comfort to the passengers, the centrifugal acceleration that is generated by the centrifugal forces should be within a certain limit, as indicated in Equations 8 and 9:

$$-a_{lim} < a_x < a_{lim} \quad (8)$$

$$v_x < \sqrt{\frac{|a_{lim}|}{k}} \quad (9)$$

The maximum allowed lateral acceleration can depend on several factors like the height of the center of gravity, the wheel base, track width, the suspension stiffness, driver comfort and the like, and can be estimated using a longitudinal and lateral dynamics model. Map data can also be used to calculate the upcoming road gradients. At each point the gradient can be calculated in accordance with Equation 10:

$$\sin\phi = \frac{z_2 - z_1}{\sqrt{(x_2 - x_1)^2 + (y_2 - y_1)^2 + (z_2 - z_1)^2}} \quad (10)$$

where $(x_1, y_1, z_1)$, $(x_2, y_2, z_2)$ are two consecutive points in the map. The future road gradient can be used to minimize the energy consumption by optimizing the propulsion forces, gear and retardation mechanisms.

The models can include observers and estimators, including a vehicle state estimator, a vehicle model parameter estimator, an energy consumption model parameter estimator, and the like. The predictive enhanced cruise controller 102 can work on the principle of minimizing energy consumption over a distance preview window or a time preview window by intelligently driving the control commands to optimal states for a given set of vehicle and environment operating conditions. To solve this energy minimization problem, the problem can be converted into either one centralized constrained mathematical optimization problem, or can be broken into multiple de-centralized mathematical optimization problems, to aid the feasibility of solution. In one example, the problem can be broken into two parts. In the first part, a short preview window optimization problem can be solved wherein the objectives of the controller can be stated as follows: minimize the consumption over the prediction window; ensure driver safety and comfort within the prediction window; maintain safe distance in the presence of traffic; maximize the distance travelled or reduce the travel time within the prediction. In the second part of this de-centralized approach example, there can be a long-term trip optimizer, whose requirements can be stated as follows: reduce the total fuel consumed over the total trip time; minimize the total trip time.

In one example, the constrained mathematical optimization problem can be formulated using a Generalized Predictive Control (GPC) methodology, which facilitates optimization of control actions over a receding time window, and considers the effects of external known disturbances, such as road inclination and speed limits and constraints on the state and control variable. A general GPC based controller can have a structure in accordance with Equations 11, 12 and 13:

$$\min_{u(0),\ldots,u(N)} l(x(N) + u(N)) + \sum_{k=0}^{N-1} f(x(k), u(k)) \quad (11)$$

such that $$x(k+1) = g(x(k), u(k)), \quad (12)$$

$$c(x(k), u(k)) \leq 0, \quad (13)$$
$$x \in X, u \in U$$

The sampling instants for the above discretized functions can be chosen as either fixed time steps or fixed distance steps. In other words, to minimize the rate of energy consumption over time in the continuous-time domain, one can minimize over fixed time or fixed distance steps in accordance with Equation 14:

$$\int \dot{f} dt = \int \frac{\dot{f}}{v} dx \quad (14)$$

A cost function that would be used by GPC can take the form in accordance with Equation 15:

$$J = q_e \sum_{kk=1}^{N_p} \dot{e}(k) + q_v \sum_{k=1}^{N_p} \|v_{ref}(k) - v_x(k)\|_{n_1} + \quad (15)$$

$$q_{vavg} \left\| \sum_{k=1}^{N_p} v_{ref}(k) - \sum_{k=1}^{N_p} v_x(k) \right\|_{n_2} + q_{vrate} \sum_{k=1}^{N_p} \|v_x(k) - v_x(k-1)\|_{n_3} +$$

$$q_{trate} \sum_{k=1}^{N_c} \|T_e(k) - T_e(k-1)\|_{n_4} + q_t \sum_{k=1}^{N_c} \|T_e(k)\|_{n_5} +$$

$$q_{rtdrate} \sum_{k=1}^{N_c} \|T_{rtd}(k) - T_{rtd}(k-1)\|_{n_6} +$$

$$q_{rtd} \sum_{k=1}^{N_c} \|T_{rtd}(k)\|_{n_7} + q_{grate} \sum_{k=1}^{N_c} \|\alpha(k) - \alpha(k-1)\|_{n_8}$$

The first term represents energy minimization; the second and third terms represent reference speed and average speed tracking respectively; the fourth term represents acceleration minimization for safety and comfort purposes; the fifth and sixth terms represent minimization of rate of change and the actual propulsion torques respectively for safety and comfort purposes; the seventh and eighth terms represent minimization of rate of change and the actual retardation torques respectively for safety comfort and fuel minimization purposes; and the last term represents the minimization of unnecessary gear change for comfort, safety and fuel minimization purpose, $q_e$, $q_v$, $q_{vavg}$, $q_{vrate}$, $q_{trate}$, $q_{rtarare}$, $q_{rtd}$, $q_{grate}$ are their respective penalty weights. In addition, a is the energy consumption rate, k and k−1 represent the current and previous sample instant's respectively, $v_x$ and $v_{ref}$ are the vehicle longitudinal velocity and reference velocities respectively, $T_e$ and $T_{rid}$ are propulsion and retardation torques respectively, $\alpha$ is the current gear, $n_1$, $n_2$, $n_3$, $n_4$, $n_5$, $n_6$, $n_7$ and $n_8$ are the respective norms of each part of the cost function. The energy minimization problem would be subject to the following constrains: vehicle speed, propulsion torque, retarding torque, distance to preceding vehicle and the like. The vehicle speed shall be within the minimum and maximum speeds in accordance with Equation 16:

$$v_{min}(k) \leq v_x(k) \leq v_{max}(k) \quad (16)$$

the minimum and maximum speed can be set by a high-level algorithm that arbitrates between posted speed limits, safe vehicle speed limits based on roadway geometry, current weather conditions, current traffic conditions, and the like. The posted speed limits, safe vehicle speed limits based on roadway geometry, current weather conditions, current traffic conditions, and the like data can, for example, be received from electronic map data sources, images of the roadway captured by cameras on the ground vehicle, or any other data source. The engine torque shall be within the minimum and maximum limits in accordance with Equation 17:

$$T_{e_{min}}(\alpha(k),\omega(k)) \leq T_e(k) \leq T_{e_{max}}(k),\omega(k)) \quad (17)$$

The retarding torque is shall be within the minimum and maximum limits in accordance with Equation 18:

$$0 \leq T_{rtd}(k) \leq T_{rtd_{max}}(k) \quad (18)$$

Engine speed shall be within the permissible limits $$\omega_{min} \leq \omega(k) \leq \omega_{max} \quad (19)$$

The distance to the preceding ground vehicle in a prediction horizon can be the greater of the safe distance in accordance with Equation 20:

$$d_{min}(k) \leq d(k) \leq d_{max}(k) \quad (20)$$

The minimum and maximum distance can be set by a high-level algorithm depending on traffic information, GPS information, road conditions, and or the like. To ensure a feasible solution to the optimization problem, the above constraints can be imposed as soft constraints. In one example, the cost function weights can be adjusted by a higher-level planning algorithm. One example would be that, based on the time consumed up to a certain instant and total trip time allowed, the cost function weights can be reduced or increased. The optimizing variable of this Generalized Predictive Control (GPC) based example can be directly the engine torque, the retarding torque and gear trajectory. Alternatively, the vehicle acceleration, velocity and gear trajectories could be used as optimization variables and converted into engine torque, retarding torque and gear trajectory by a lower level controller. The selection of the strategy can depend on the availability of the control signals, and the feasibility of the solution of the optimization problem.

The optimal gear sequence should minimize energy consumption, minimize arrival time, minimize gear shifts and make sure that the gears are not shifted by more than a specific number at each time sample. There can be two strategies of optimizing the gear sequence. In a first strategy, a torque level can be requested that will indirectly control the transmission to be in a desired gear. For example, given a particular speed of the ground vehicle, less torque can be requested so that the transmission will not downshift and hence put the engine in a less efficient operating region. In a second strategy, the transmission can be controlled to directly select a desired gear. A number of methods can be used to find the optimal, or suboptimal solutions in some cases, engine torque ($T_e$) and gear (g) for each driving instant.

In a first implementation, non-linear optimization with the gear as an integer control variable can be utilized. To accommodate energy loss incurred by non-optimal gear selection, a model of gear behavior can be included in the constraints of the GPC optimization problem discussed above. The gear can be optimized in addition to torque. The vehicle model and the energy consumption models can be affected by the introduction of the gear variable, and therefore, the models can be amended to include the new variables. This problem can be tackled by Dynamic Programming (DP) method, by an outer approximation and generalized Bender decomposition method, or by a branch-and-bound method.

In a second implementation, the GPC can optimize engine torque ($T_e$) and velocity (V) with indirect gear control followed by another layer of gear optimization. The gear ratio ($r_g$) can be implicitly included in the equations describing the vehicle velocity and energy rate. The GPC can be utilized to find the optimal engine torque ($T_e$) and velocity (V) that minimize fuel and tracks the desired set speed. The optimal engine torque ($T_e$) and velocity (V) can be input to a gear optimization problem that selects the optimal gear for every sampling time of the GPC prediction horizon. The optimization problem should be able to handle integer decision variable as well as satisfy the constraints relating gear or torque and engine speed. Search methods such as dynamic programming can also be used. To reduce computation time, it can be assumed that gear control is sampled at slower time than GPC. Control and prediction horizons for the second block can vary from the first block. The following Equations 21, 22, 23 and 24 elaborate more on how to include gear as an implicit variable:

$$r_g = f_1(T_e, v_x), r_g \in \{r_{g1}, \ldots, r_{g_{max}}\} \quad (21)$$

$$\dot{e} = f_2(T_e, v_x, r_g) = f_5(T_e, v_x) \quad (22)$$

$$\dot{v}_x = f_3(T_e, v_x, r_g) = f_6(T_e, v_x) \quad (23)$$

$$\alpha = f_4(r_g), \alpha \in \{1, \ldots, \alpha_{max}\} \quad (24)$$

The optimal engine torque ($T_e$) and velocity ($V_x$) can utilize $f_5$ and $f_6$, while the $f_1$, $f_2$ and $f_4$ can be utilized to determine the optimal gear.

In a third implementation, the GPC can optimize engine torque ($T_e$) and gear (g) with direct gear control followed by another layer of gear optimization. The gear ratio ($r_g$), and hence the gear, can be a continuous-time variable. As a result, the GPC decision variable will be engine torque ($T_e$) and gear (g), and the constraints can ensure that the selected gear satisfies engine speed and torque requests. A second optimization block can select the optimal gear for each time step such that the output is an integer and optimal. The second optimization can be a simple round to the nearest integer operator or a more advanced optimization or search algorithm such as dynamic programming. To reduce computation time, it can be assumed that gear control is sampled at a slower time than GPC. In addition, control and prediction horizons for the second optimization can vary from the first optimization.

In a fourth implementation, GPC can minimize the energy consumption in a two-step approach. In the first step, the amount of energy that is needed to drive the vehicle (E) for a certain amount of distance for given operating conditions is minimized in accordance with Equation 25:

$$\min E = \min \int F dx = \min \int \frac{T_\alpha}{r_w} v_x dt = \quad (25)$$
$$\min \int \frac{(\dot{v}_x + k_1 v_x^2 + k_2 v_x + k_6 \cos\theta - k_7 - g\sin\theta)}{k_3 r_w} v_x dt$$

An optimal vehicle longitudinal velocity ($v_x$) and drive torque at the wheels ($T_\alpha$) can be found from the above minimization problem. In the second step, another optimization problem will be solved. In this step, the longitudinal velocity and drive torque sequences obtained above will be utilized to generate a set of engine torques ($T_e$), retardation torques ($T_b$) and ($T_{trd}$) and gears ($\alpha$) that minimize energy spent by the propulsion system (e), while tracking the longitudinal velocity ($v_x$) and drive torque derived ($T_\alpha$) above in accordance with Equation 26:

$$\text{given } T_\alpha \text{ and } v_x, \min \int \dot{e} dt \quad (26)$$

Where $\dot{e}$ is given by (1). The GPC can include, but not be limited to, the cost and constraints in accordance with Equations 15, 16, 17, 18, 19 and 20. The optimization can be done using Dynamic Programming or any other search method. To reduce computation time, the gear control can be assumed to be sampled at a slower time than GPC. In addition, control and prediction horizons for the second optimization can vary from the first optimization.

Other gear control methods can include adding in linear gear ratio estimation to the cost function, GPC with linear gear ratio estimation to determine optimal gear, and or the like. Shift schedule can be similarly optimized based on mass. Either gear shifting can be controlled from a vehicle interface/integration control module (VICM) or accurate mass information can be provided to the transmission controller to handle shifting in an energy efficient manner. Intelligent shift logic can also include providing for shifting into neutral on descending grade or the like. Graphics processing units can be utilized for analyzing the models for distributed optimization to improve computation time for real-time GPC computing.

Parameter and state estimation can be utilized to determine vehicle velocity and acceleration, vehicle pitch angle, road gradient, vehicle mass, aerodynamic drag, coefficient of rolling resistance, brake pressure and drive force estimation. In one implementation, vehicle velocity and acceleration can be estimated from wheel speed information and map information using estimators such as the Kalman filter. Vehicle pitch angle can be estimated from vehicle pitch information, if available, and brake pressure information. Road gradient can be estimated from vehicle pitch angle estimation, vehicle acceleration estimation, map information using estimators such as the Kalman filter. Vehicle mass, aerodynamic drag, and coefficient of rolling resistance can be estimated from vehicle dynamic equation, vehicle velocity estimation, vehicle acceleration estimation, road gradient estimation, road data, environment data and combination of least square estimation and artificial intelligence algorithms. Brake pressure can be estimated from vehicle velocity, vehicle acceleration, vehicle pitch angle, road gradient, vehicle mass, aerodynamic drag, coefficient of rolling resistance, the vehicle dynamic equation using estimators such as the Kalman filter. Drive force can be estimated from vehicle velocity, vehicle acceleration, vehicle pitch angle, mad gradient, vehicle mass, aerodynamic drag, coefficient of rolling resistance, break pressure and camera information. Since the measurements are sampled at a much faster rate than the control signals, we can use dual rate observers or Kalman Filters to enhance our estimates of the unknown parameters mentioned above.

Ground vehicle mass estimation can be based on recursive least squares with multiple forgetting factors, or least squares with non-redundant data stacked up according to singular value decomposition. Vehicle states can be determined based on vehicle velocity and acceleration, pitch angle and road gradient, brake pressure, drive forces and the like. Engine and transmission parameters can be determined based on shifting, torque map, fuel map, and the like The predictive enhanced cruise controller 102 can dynamically adjust the operation of the ground vehicle such that energy consumption is decreased. As the roadway, driving environment, and conditions associated with the roadway dynamically change, the predictive enhanced cruise controller 102 can dynamically adjust the operation of the ground vehicle to decrease the overall energy consumption of the ground vehicle. For example, rather than simply having the ground vehicle operate at a set speed, the predictive enhanced cruise controller 102 may automatically adjust the operation of the ground vehicle to operate within a target vehicle performance plan bounded by a minimum and maximum speed of the target speed window. The predictive enhanced cruise controller 102 can identify various driving parameters and the corresponding impact of the driving parameters on the operation of the ground vehicle in real-time and automatically adjust the operation of the ground vehicle to also reduce braking, shifting, travel distance, travel time, and the like.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A ground vehicle forward-looking control system comprising:
   a plurality of sensors configured to detect a plurality of ground vehicle operating parameters, driver control inputs, and one or more driving environment parameters, wherein the one or more driving environment parameters includes at least one predicted driving environment parameter; and
   a controller configured to;
     determine a target speed window based on one or more of one or more ground vehicle operating parameters and one or more driving environment parameters;
     determine a target vehicle performance plan including torque, velocity and gear, based on the target speed window and one or more of the one or more ground vehicle operating parameters, the driver control inputs and the one or more driving environment parameters including the at least one predicted driving environment parameter utilizing a Generalized Predictive Control (GDP) over a receding time window based on torque, velocity and gear to reduce energy consumption by a ground vehicle within the target speed window; and
     generate one or more of one or more modulated driver control inputs and one or more of ground vehicle input operating parameters for output to one or more actuators of the ground vehicle based on the determined target speed window and the determined target vehicle performance plan.

2. The ground vehicle control system of claim 1, wherein the controller is further configured to determine the target speed window based on one or more of the one or more ground vehicle operating parameters and the one or more driving environment parameters to minimize energy consumption by the ground vehicle.

3. The ground vehicle control system of claim 1, wherein the controller is further configured to determine one or more of the target speed window and the target vehicle performance plan based on the one or more of the one or more ground vehicle operating parameters, the driver control inputs and the one or more driving environment parameters to reduce braking, and reduce shifting.

4. The ground vehicle control system of claim 1, wherein:
   the plurality of ground vehicle operating parameters include one or more of a current vehicle speed, a current vehicle acceleration, an engine speed, an engine torque, a transmission speed, a transmission torque, a transmission gear, and one or more energy input rates; and
   the controller is further configured to determine the target vehicle performance plan based on the one or more ground vehicle operating parameters including one or more of the current vehicle speed, the current vehicle acceleration, the current engine speed, the engine torque, the transmission speed, the transmission torque, the transmission gear, and the one or more energy input rates to minimize energy consumption.

5. (;Original) The ground vehicle control system of claim 1, wherein:
the one or more driving environment parameters include one or more of a predicted driving event/risk, geometry of one or more upcoming roadway segments, current traffic conditions and current driving conditions; and
the controller is further configured to determine the target vehicle performance plan based on the one or more driving environment parameters including one or more of the predicted driving event/risk, the geometry of one or more upcoming roadway segments, the current traffic conditions and the current driving conditions to minimize energy consumption.

6. The ground vehicle control system of claim 1, the controller further configured to:
determine a target transmission gear plan based on the target vehicle performance plan and one or more of the one or more ground vehicle operating parameters, the driver control inputs and the one or more driving environment parameters to minimize one or more of energy consumption by the ground vehicle and shifting; and
generate the one or more of one or more modulated driver control inputs and one or more ground vehicle input operating parameters for output to one or more actuators of the ground vehicle based on the determined target speed window, the determined target vehicle performance plan and the determined target transmission gear plan.

7. The ground vehicle control system of claim 1, wherein the controller is configured to determine the target speed window further based on one or more of a posted speed limit window, a driver based speed window, a road topology based speed adjustment of one or more future roadway segments, and a driving condition based speed adjustment.

8. The ground vehicle control system of claim 1, wherein the controller is configured to determine the target vehicle performance plan based on the one or more of the one or more ground vehicle operating parameters and the one or more driving environment parameters utilizing the Generalized Predictive Control (GPC) including one or more of a longitudinal vehicle dynamics model, a lateral vehicle dynamics model, an energy consumption model, an engine model, a transmission model, and a road topology model to minimize energy consumption.

9. A ground vehicle control method comprising:
determining a target speed window based on one or more of one or more ground vehicle operating parameters and one or more driving environment parameters;
determining a target vehicle performance plan based on the target speed window and one or more of the one or more ground vehicle operating parameters, one or more driver control inputs and the one or more driving environment parameters utilizing a Generalized Predictive Control (GDP) over a receding time window based on torque, velocity and gear to reduce energy consumption by a ground vehicle; and
generating one or more vehicle operating indicators for output to a driver of the ground vehicle based on the determined target speed window and the determined target vehicle performance plan.

10. The ground vehicle control method according to claim 9, comprising further determining the target vehicle performance plan to reduce braking by the ground vehicle.

11. The ground vehicle control method according to claim 9, comprising further determining the target speed window based on one or more of the one or more ground vehicle operating parameters and the one or more driving environment parameters to reduce energy consumption by the ground vehicle.

12. The ground vehicle control method according to claim 9, wherein:
the one or more ground vehicle operating parameters include one or more of a current vehicle speed, a current vehicle acceleration, an engine speed, an engine torque, a transmission speed, a transmission torque, a transmission gear, and one or more energy input rates; and
the target vehicle performance plan is determined based on the one or more ground vehicle operating parameters including one or more of the current vehicle speed, the current vehicle acceleration, the current engine speed, the engine torque, the transmission speed, the transmission torque, the transmission gear, and the one or more energy input rates to minimize energy consumption.

13. The ground vehicle control method according to claim 9, wherein:
the one or more driving environment parameters include one or more of a predicted driving event/risk, geometry of one or more upcoming roadway segments, current traffic conditions and current driving conditions; and
the target vehicle performance plan is determined based on the one or more driving environment parameters including one or more of the predicted driving event/risk, the geometry of one or more upcoming roadway segments, the current traffic conditions and the current driving conditions to minimize energy consumption.

14. The ground vehicle control method according to claim 9, further comprising:
determining a target transmission gear plan based on the target vehicle performance plan and one or more of the one or more ground vehicle operating parameters, the driver control inputs and the one or more driving environment parameters to reduce shilling by the ground vehicle; and
generating the one or more vehicle operating indicators for output to the driver of the ground vehicle based on the determined target speed window, the determined target vehicle performance plan and the determined target transmission gear plan.

15. The ground vehicle control method according to claim 9, comprising further determining the target speed window further based on one or more of a posted speed limit window, a driver based speed window, a road topology based speed adjustment of one or more future roadway segments, and a driving condition based speed adjustment.

16. The ground vehicle control method according to claim 9, comprising further determining the target vehicle performance plan based on the one or more of the one or more ground vehicle operating parameters, the driver control inputs and the one or more driving environment parameters utilizing the Generalized Predictive Control (GPC) including one or more of a longitudinal vehicle dynamics model, a lateral vehicle dynamics model, an energy consumption model, an engine model, a transmission model, and a road topology model to minimize energy consumption.

17. The ground vehicle control method according to claim 16, wherein the energy consumption model includes predicting energy consumed by the ground vehicle as a function of engine speed and an engine torque.

18. The ground vehicle control method according to claim 16, wherein the longitudinal dynamic vehicle mode includes predicting the velocity of the ground vehicle based on a force balance equation.

19. The ground vehicle control method according to claim 16, wherein the GPC includes a short preview window optimization and a long-term trip optimization.

20. The ground vehicle control method according to claim 16, wherein the GPC includes:
  minimization of energy consumed by the ground vehicle;
  tracking reference speed and average speed of the ground vehicle;
  minimization of acceleration of the ground vehicle for safety and comfort;
  minimization of propulsion torque and rate of change of the propulsion torque of the ground vehicle for safety and comfort;
  minimization of retardation torque and rate of change of the retardation torque of the ground vehicle for safety, comfort and fuel minimization; and
  minimization of gear change of the ground vehicle.

21. The ground vehicle control method according to claim 16, wherein the GPC is constrained by one or more of a speed, propulsion torque, retardation torque, engine speed, and safe following distance of the ground vehicle.

22. The ground vehicle control method according to claim 21, wherein the GPC is optimized for engine torque, retardation torque and a gear trajectory.

23. The ground vehicle control method according to claim 21; wherein:
  the GPC is optimized for acceleration, velocity and a gear trajectory; and
  the optimized acceleration, velocity and gear trajectory are converted into engine toque, retardation torque and the gear trajectory.

* * * * *